Feb. 21, 1950          J. H. RAMSER          2,498,506
OPTICAL METERING MEANS FOR GAS USING A SLIDING TUBE
Filed June 11, 1947          3 Sheets-Sheet 1

ATTEST

INVENTOR.
John H. Ramser
BY
Attorney

Feb. 21, 1950        J. H. RAMSER        2,498,506
OPTICAL METERING MEANS FOR GAS USING A SLIDING TUBE

Filed June 11, 1947        3 Sheets-Sheet 2

ATTEST
Robert I. Staples

INVENTOR.
John H. Ramser
BY Norbert E. Birch
Attorney

Feb. 21, 1950 J. H. RAMSER 2,498,506
OPTICAL METERING MEANS FOR GAS USING A SLIDING TUBE
Filed June 11, 1947 3 Sheets-Sheet 3

ATTEST
Robert J. Staples

INVENTOR.
John H. Ramser
BY Norbert E. Birch
Attorney

Patented Feb. 21, 1950

2,498,506

UNITED STATES PATENT OFFICE 2,498,506

OPTICAL METERING MEANS FOR GAS USING A SLIDING TUBE

John H. Ramser, Chester, Pa., assignor to The Atlantic Refining Company, Philadelphia, Pa., a corporation of Pennsylvania Application June 11, 1947, Serial No. 753,983

5 Claims. (Cl. 88—14)

1

The present invention relates to improvements in apparatus adapted to determine the amount of entrained material in a fluid, particularly to determine the amount of entrained solids in a gas, and more particularly to determine the amount of catalyst fines present in the flue gas from a regenerator of a fluid catalytic cracking unit.

In the operation of a fluid catalytic cracking unit, finely divided catalyst particles are injected into the fluid charge stream and, suspended therein, are carried to the reactor where, after their activity has been spent, such particles are caused to settle out and to return to the regenerator. Hot air and steam blown through the regenerator remove coke or like matter deposited on the catalyst. As the hot air and steam are removed from the regenerator, such gases are passed through a cyclone separator and a precipitator to remove the catalyst particles remaining entrained therein. Although the greater part of the catalyst present in the gas is removed by such means there still remains a portion thereof suspended in said gas when it enters the flue leading from the precipitator. As the catalyst can be regenerated and used repeatedly, any loss thereof before it has become completely spent will increase the cost of the process being carried out. It is, therefore, of economic importance to keep the loss of catalyst at a minimum. Since the concentration of catalyst in the flue gas varies with operating conditions such as regenerator gas rate, water and ammonia content of the gas, and other factors, it is desirable to know the exact concentration of catalyst in the flue gas in order that such concentration can be held to a minimum by the control of such factors.

Heretofore, the concentration of catalyst fines in the flue gas of a fluid catalytic cracking unit has been determined by spot tests utilizing porous filters. This method is, however, subject to certain inherent defects, chief among them being the necessity for laborious calculations each time the test is run, possibility of error, and inability to determine the time variation of catalyst concentration in the gas unless frequent tests are run with a resulting increase in labor. Furthermore, it has, in the past, been impossible to determine the total amount of catalyst lost over any given period of time without resort to frequent tests and correlation of the results obtained thereby with the rate of gas flow such rate being obtained by divers other methods.

One of the objects of the invention, therefore, is to provide means adapted for the instantaneous determination of the concentration of entrained

2 solids in a gas, and more particularly for the instantaneous determination of the concentration of catalyst fines in the flue gas from a precipitator of a fluid catalytic cracking unit.

Another object of the invention is to provide means adapted for the continuous determination of the concentration of catalyst fines in the flue gas from a fluid catalytic cracking unit precipitator at a given point within the stack of such unit.

A further object of the invention is to provide means whereby a reading for a zero concentration of catalyst can be obtained without interfering with the normal operation of the catalytic cracking unit.

Other objects of the invention will be apparent from the description and claims which follow.

The theory underlying the development of the present invention is that the actual concentration of catalyst fines at all points of a cross section of the flue gas stream in the stack is practically constant at any given instant of time even though the velocity of such gas stream may vary widely from point to point. If a beam of light of intensity $I_0$ is sent through the flue gas stream, the intensity of the transmitted light $I$ is lower than $I_0$ as a consequence of partial absorption and scattering of light by the catalyst particles in the flue gas. Since absorption and scattering of light by solid particles is independent of the state of motion of such particles, the intensity of the transmitted light is a function only of the concentration of the particles and the size thereof. Since the particle size varies only within narrow limits the relationship between transmitted light intensity and concentration can be determined for a given length of absorption path and given initial intensity of light; thus unknown concentrations may be instantly read or recorded by means of the intensity of the transmitted light.

In the drawing like numerals are used to designate like parts.

Figure 1:
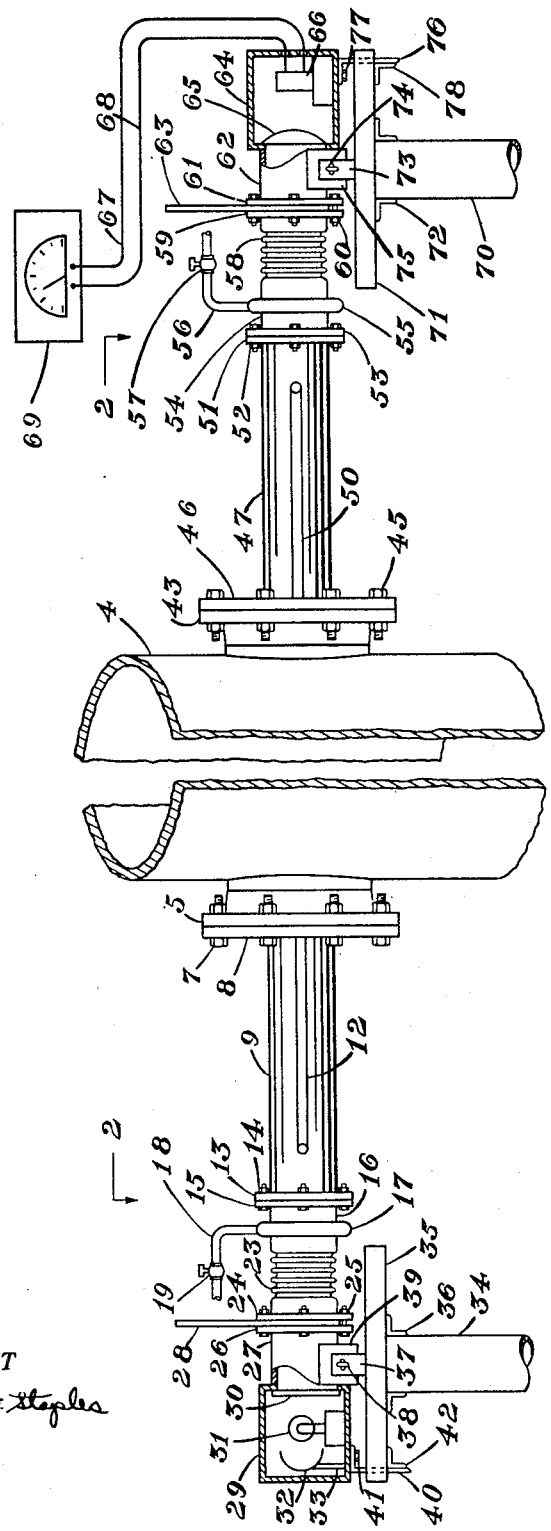
Figure 1 is a front elevational view exemplifying the apparatus partially in cross section.

In the drawing, 4 represents a duct or stack carrying the flue gas in which the finely divided catalyst is suspended. Pipe flange 5 is affixed at an aperture 6 in the wall of duct 4 by welding or by other suitable means and has fastened thereto, as by bolts 7, or by other suitable means, apertured plate 8. Casing 9 extends through apertured plate 8 and is fastened thereto by welding or by other suitable means. Tube 10 is slidably disposed within casing 9 and projects beyond the inner end thereof adjacent aperture 6 in duct 4. Handles 11 and 12 slidably extend through apertured plate 8 and are affixed to tube 10, the purpose of tube 10 and handles 11 and 12 being more fully discussed hereinafter.

The outer end of casing 9 is externally flanged as at 13 and detachably affixed, as by bolts 14, to flange 15 on pipe 16. Air injector 17 provided with inlet 18, controlled by valve 19 is disposed around pipe 16. Passage of air from air injector 17 into pipe 16 is permitted by holes 20 in said injector, tubes 21, and openings 22 circumferentially spaced in the wall of pipe 16. Formed as an integral part of pipe 16 is flexible metal bellows 23, the purpose of which will be discussed hereinafter.

Flange 24 on the outer end of pipe 16 is affixed, as by bolts 25, to flange 26 on light source pipe 27. Positioned between flange 24 and flange 26 and adapted to blank off light source pipe 27 from pipe 16 when so desired is figure 8 flange 28.

Detachably affixed to the outer end of light source pipe 27 is light source housing 29 having positioned internally thereof window 30 capable of transmitting light but preventing admission of air from light source pipe 27. Also provided within light source housing 29 are light source 31, such as, for example, a tungsten filament lamp or the like, and parabolic mirror 32 affixed to housing 29 as at 33.

For purposes of support, column 34 is provided. Plate 35 on top of such column and affixed thereto by angle irons such as 36 bears slidable bracket 37 which, by means of bolt 38, is removably attached to fin 39 welded, or fastened by other suitable means, to light source pipe 27. Further support for light source housing 29 is provided by L-shaped support 40 detachably affixed to the underside of such housing by bolt 41, such support extending downward through plate 35 and being affixed to angle iron 42, by any suitable means which will permit either vertical or horizontal movement of housing 29, if desired.

Figure 2:
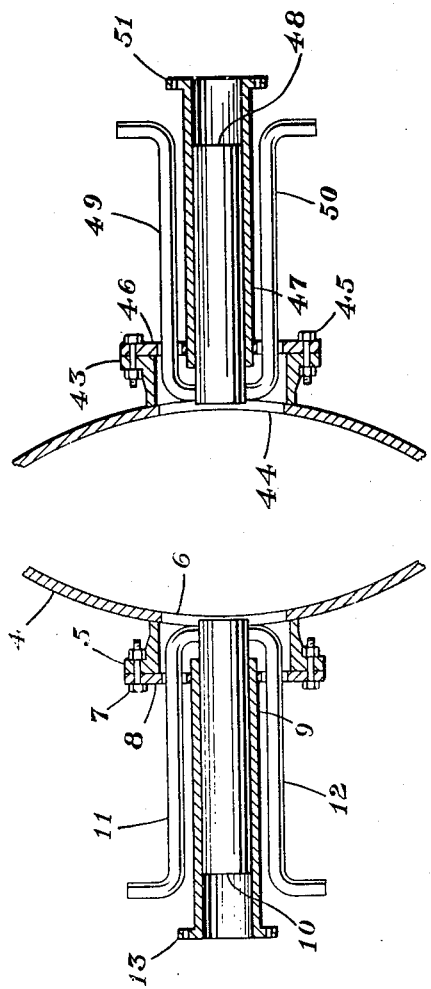
Figure 2 is an enlarged top view partially in cross section taken along the line 2—2 in Figure 1.

Pipe flange 43 is affixed at aperture 44 in the wall of duct 4 by welding or by other suitable means, and has fastened thereto, as by bolts 45, or other suitable means, apertured plate 46. It will be apparent by reference to the drawing, particularly Figures 1 and 2 that aperture 44 is formed in the wall of duct 4 at a diametrically opposed point to aperture 6 so that pipes 9 and 47 are coaxially arranged. Casing 47 extends through apertured plate 46 and is fastened thereto by welding or other suitable means. Tube 48 is slidably disposed within casing 47 and projects beyond the inner end thereof adjacent aperture 44 in duct 4. Handles 49 and 50 slidably extend through apertured plate 46 and are affixed to tube 48, the purpose of tube 48 and handles 49 and 50 being more fully discussed hereinafter.

Figure 3:
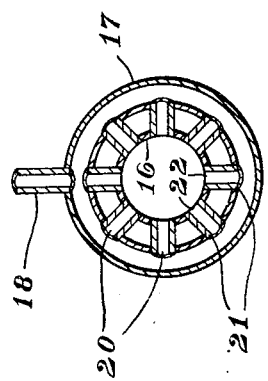
Figure 3 is an enlarged cross sectional view of air injector 17 shown in Figure 1.

The outer end of casing 47 is externally flanged as at 51 and detachably affixed, as by bolts 52, to flange 53 on pipe 54. Air injector 55, provided with inlet 56 controlled by valve 57 is disposed around pipe 54. Air injector 55 is, in all respects, identical with air injector 17 shown in detail in Figure 3. Formed as an integral part of pipe 54 is flexible metal bellows 58, the purpose of which will be discussed hereinafter.

External flange 59 on the outer end of pipe 54 is affixed, as by bolts 60, to flange 61 on light receiving pipe 62. Positioned between flange 59 and flange 61 and adapted to blank off light receiving pipe 62 when so desired is figure 8 flange 63.

Detachably affixed to the outer end of light receiving pipe 62 is light sensitive element housing 64 having positioned internally thereof planoconvex lens 65 effectually preventing the admission of air from light receiving pipe 62 but permitting the passage of light. Light sensitive element 66, such as a thermopile, or the like, is positioned within light sensitive element housing 64 and is connected by wires 67 and 68 to output meter 69, such as, for example, a millivolt potentiometer or the like.

For purposes of support, column 70 is provided. Plate 71 on top of such column and affixed thereto by angle irons 72 bears slidable bracket 73 which, by means of bolt 74, is removably attached to fin 75 welded, or fastened by other suitable means, to light receiving pipe 62. Further support for light sensitive element housing 64 is provided by L-shaped support 76 detachably affixed to the underside of such housing by bolt 77, the support extending downward through plate 71 and being affixed to angle iron 78 by any suitable means which will permit either horizontal or vertical movement of housing 64, if desired.

It will readily be understood that, while the device described above presents a preferred embodiment of the invention, certain variations can be made without departing from the scope of the appended claims. For example, although a tungsten filament lamp, a thermopile, and a millivolt potentiometer have been specified as light source 31, light sensitive element 66, and output meter 69, respectively, any combination reaching a similar result can be used. Among such other combinations that might suggest themselves to those conversant with the art are a mercury arc lamp, a photocell of the barrier layer type, and a microammeter; or a sodium vapor lamp, a photoelectric tube, and an amplifier connected to a suitable current or voltage measuring device.

The operation of the device is as follows:

As the flue gas carrying an unknown concentration of catalyst passes through duct 4, a light beam of constant intensity emitted by light source 31 and reflected in parallel rays by parabolic mirror 32 emerges from light source housing 29 through window 30 into light source pipe 27, passes through pipe 16 and tube 10 and thence enters duct 4. The light beam traverses the known diameter of duct 4, enters slidable tube 48 positioned within casing 47 and passes through pipe 54 into light receiving pipe 62. The total transmitted light is focused by plano-convex lens 65 upon light sensitive element 66 in light sensitive element housing 64. The electromotive force generated by the impact of such light beam upon light sensitive element 66 is indicated by output meter 69. Since the intensity of transmitted light as a function of catalyst concentration has been determined by previous experimentation, the instantaneous concentration of catalyst in the flue gas may be determined by converting the reading of output meter 69 into concentration by use of a calibration curve or other suitable means. If so desired, output meter 69 can be calibrated directly in terms of catalyst concentration.

In order to record accurately the concentration of catalyst in the flue gas, the intensity of the light beam must be kept constant at all times. Air injectors 17 and 55 are adapted to achieve this end. The injection of air into pipe 16 and pipe 54 through the respective injectors gives rise to a pressure in such pipes which is positive in relation to the pressure in duct 4 and results in a smooth, uniform flow of air from said pipes into said duct. Such being the case, the accumulation of catalyst particles or moisture in the light path or on window 30 and plano-convex lens 65 will be inhibited.

Figure 4:
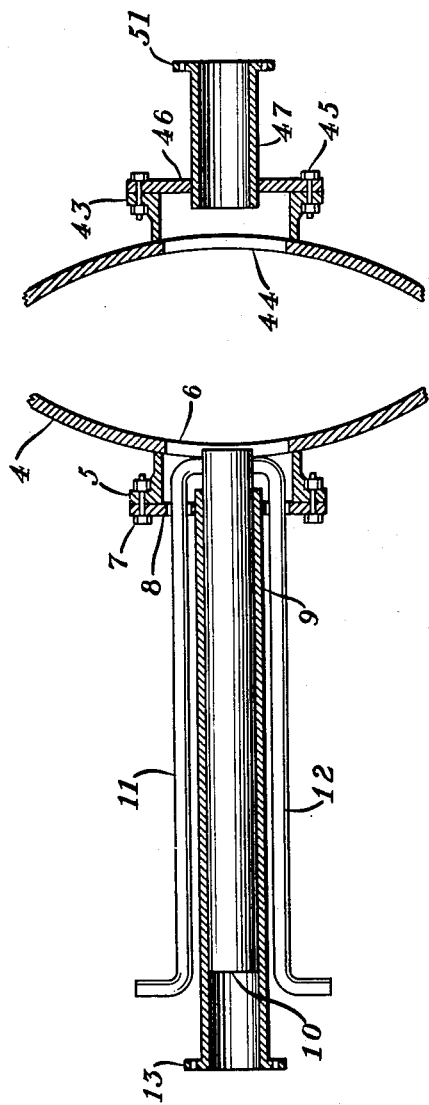
Figure 4 is a top view, partially in cross section, of a modification of the apparatus illustrating a single tube for checking the zero reading of the optical system.

The intensity of the light beam for a zero concentration of catalyst (upon which intensity all other calculations are based) can be determined without interfering with the flow of flue gas through duct 4. By means of handles 11 and 12, tube 10 slidably positioned within casing 9, is advanced into duct 4. Similarly tube 48 slidably positioned within casing 47 is advanced by handles 49 and 50 until a junction is made with tube 10, thereby providing a passage, substantially free of catalyst particles through which the light beam can pass. A reading can then be obtained on output meter 69 and compared with the original reading for a zero concentration of catalyst. If the readings do not coincide the intensity of the light beam is readjusted to its original value by varying the intensity of light source 31. Once said original reading has been obtained, the slidable tubes are retracted to their inoperative positions within casings 9 and 47 respectively. It is apparent that, instead of two slidable tubes such as 10 and 48, one tube can be used if of sufficient length to span the entire diameter of duct 4. This is illustrated in Figure 4, where casing 47 is shortened since no extendable tube is disposed therein, and the opposite casing 9 is lengthened to accommodate the lengthened tube 10 which may be extended across duct 4 by handles 11 and 12, thus making contact with the inner end of casing 47, and providing a light path free of solids. Regardless of whether the double tube or single tube zeroing arrangement is used, air is continuously injected during the extension of the tube or tubes across the conduit 4 in order to clear the tube or tubes of suspended solids which might otherwise accumulate therein.

It has been found that, after an extended period of operation, the reading for zero concentration of catalyst is less than the original reading, due to the slow accumulation of catalyst on window 30 and plano-convex lens 65. As a result, it is necessary to clean window 30 and plano-convex lens 65. In such case figure 8 flanges 28 and 63 are turned until the blank portions thereof are seated between light source pipe 27 and pipe 16, and light receiving pipe 62 and pipe 54 respectively, thus blanking off light source pipe 27 and light receiving pipe 65 from duct 4. Thus, window 30 and plano-convex lens 65 can be removed from light source housing 29 and light sensitive element housing 64, respectively, without halting normal operation of duct 4 or permitting flue gas or catalyst particles to enter the respective housings.

The accurate adjustment of the apparatus to provide a continuous path from light source 31 to light sensitive element 66 can be readily accomplished by virtue of slidable brackets 37 and 73 affixed to light source pipe 27 and light receiving pipe 62, respectively. By raising or lowering light source housing 29 and light sensitive element housing 64 with respect to brackets 37 and 73 respectively, and adjusting bolt 38 with respect to bracket 37 and bolt 74 with respect to bracket 73, a path through which the light beam can pass with no obstruction other than the entrained catalyst is obtained. Furthermore, such adjustment can also be obtained by moving housing 29 and support 40 relative to angle iron 42, and housing 64 and support 76 relative to angle iron 78.

Bellows 23 and 58 on pipes 16 and 54, respectively, are adapted to minimize the transfer of vibration and heat from duct 4 to the more sensitive parts of the device, namely, light source 31 and light sensitive element 66 by reason of their flexibility, thinness of wall, and large surface area.

The examples here given and the particular description set forth are presented in order to illustrate how the invention may be applied. Other forms and variations coming within the scope of the appended claims will readily suggest themselves to those skilled in the art.

I claim:

1. An optical system for determining the concentration of entrained solids in a gas which comprises a duct having opposed openings in the walls thereof, pipes associated with said openings, a light source positioned within one of said pipes, and a light sensitive element positioned within the other of said pipes, a tube slidably mounted within at least one of said pipes and extendable therefrom at right angles into said duct for selectively excluding entrained solids from the portion of the path within said duct traversed by light passing from said light source to said light sensitive element without substantial interference with the normal passage of said entrained solids through said duct, and means for creating a positive gas flow from said pipes and said tube into said duct to remove entrained solids when said tube is extended into said duct.

2. An optical system for determining the concentration of entrained solids in a gas which comprises a duct having opposed openings in the walls thereof, pipes associated with said openings, a light source positioned within one of said pipes, and a light sensitive element positioned within the other of said pipes, a tube slidably mounted within one of said pipes and extendable therefrom at right angles into said duct to contact the other of said pipes for selectively excluding entrained solids from the portion of the path within said duct traversed by light passing from said light source to said light sensitive element without substantial interference with the normal passage of said entrained solids through said duct, and means for creating a positive gas flow from said pipes and said tube into said duct to remove entrained solids when said tube is extended into said duct.

3. An optical system for determining the concentration of entrained solids in a gas which comprises a duct having opposed openings in the walls thereof, pipes associated with said openings, a light source positioned within one of said pipes, and a light sensitive element positioned within the other of said pipes, a tube slidably mounted within each of said pipes and extendable therefrom at right angles into said duct to contact the other tube for selectively excluding entrained solids from the portion of the path within said duct traversed by light passing from said light source to said light sensitive element without substantial interference with the normal passage of said entrained solids through said duct, and means for creating a positive gas flow from said pipes and tubes into said duct to remove entrained solids when said tubes are extended into said duct.

4. An optical system for determining the concentration of entrained solids in a gas which comprises a duct having opposed openings in the walls thereof, pipes associated with said openings, a light source positioned within one of said pipes, and a light sensitive element positioned within the other of said pipes, a tube slidably mounted within one of said pipes and extendable therefrom at right angles into said duct to contact the other of said pipes for selectively excluding entrained solids from the portion of the path within said duct traversed by light passing from said light source to said light sensitive element without substantial interference with the normal passage of said entrained solids through said duct, handles attached to said tube to extend said tube into said duct, and means for creating a positive gas flow from said pipes and said tube into said duct to remove entrained solids when said tube is extended into said duct.

5. An optical system for determining the concentration of entrained solids in a gas which comprises a duct having opposed openings in the walls thereof, pipes associated with said openings, a light source positioned within one of said pipes, and a light sensitive element positioned within the other of said pipes, a tube slidably mounted within each of said pipes and extendable therefrom at right angles into said duct to contact the other tube for selectively excluding entrained solids from the portion of the path within said duct traversed by light passing from said light source to said light sensitive element without substantial interference with the normal passage of said entrained solids through said duct, handles attached to each of said tubes to extend same into said duct to contact the other tube, and means for creating a positive gas flow from said pipes and tubes into said duct to remove entrained solids when said tubes are extended into said duct.

JOHN H. RAMSER.

REFERENCES CITED

The following references are of record in the file of this patent:

UNITED STATES PATENTS

| Number | Name | Date |
|---|---|---|
| 892,241 | Freise | June 30, 1908 |
| 1,810,739 | Vedder | June 16, 1931 |
| 1,969,626 | Simon et al. | Aug. 7, 1934 |
| 1,969,627 | Simon et al. | Aug. 7, 1934 |
| 2,042,095 | Grant | May 26, 1936 |
| 2,346,690 | Larkins | Apr. 18, 1944 |
| 2,369,966 | Hawkins | Feb. 20, 1945 |

FOREIGN PATENTS

| Number | Country | Date |
|---|---|---|
| 438,629 | Great Britain | Nov. 20, 1935 |